US008359592B2

(12) United States Patent
Duplessis et al.

(10) Patent No.: US 8,359,592 B2
(45) Date of Patent: Jan. 22, 2013

(54) IDENTIFYING GROUPS AND SUBGROUPS

(75) Inventors: Jean-Pierre Duplessis, Redmond, WA (US); Christopher J. Lovett, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 12/406,976

(22) Filed: Mar. 19, 2009

(65) Prior Publication Data
US 2010/0242027 A1    Sep. 23, 2010

(51) Int. Cl.
*G06F 9/44* (2006.01)
*G06F 9/45* (2006.01)
*G06F 9/445* (2006.01)
(52) U.S. Cl. .................. 717/174; 717/154; 717/168
(58) Field of Classification Search .................. None
See application file for complete search history.

(56) References Cited

U.S. PATENT DOCUMENTS

| | | | |
|---|---|---|---|
| 6,094,654 A | 7/2000 | Van Huben et al. | |
| 7,185,076 B1 | 2/2007 | Novaes et al. | |
| 7,478,397 B1 | 1/2009 | Borries et al. | |
| 7,926,051 B2* | 4/2011 | Barta et al. | 717/174 |
| 2004/0103389 A1* | 5/2004 | Song et al. | 717/154 |
| 2005/0102665 A1* | 5/2005 | Barta et al. | 717/174 |
| 2005/0102666 A1* | 5/2005 | Barta et al. | 717/174 |
| 2005/0102667 A1* | 5/2005 | Barta et al. | 717/174 |
| 2005/0262488 A1* | 11/2005 | Wagner et al. | 717/168 |
| 2007/0162903 A1* | 7/2007 | Babb et al. | 717/154 |
| 2008/0183873 A1* | 7/2008 | Banavar et al. | 709/226 |
| 2008/0216069 A1* | 9/2008 | Leymann et al. | 717/174 |
| 2008/0216098 A1* | 9/2008 | Agarwal et al. | 719/328 |
| 2008/0294686 A1 | 11/2008 | Long et al. | |
| 2009/0012984 A1 | 1/2009 | Ravid et al. | |
| 2009/0106748 A1* | 4/2009 | Chess et al. | 717/168 |
| 2010/0063785 A1* | 3/2010 | Pich et al. | 703/6 |
| 2010/0070497 A1* | 3/2010 | Duplessis et al. | 707/736 |
| 2010/0145480 A1* | 6/2010 | Yoshikawa | 700/19 |
| 2011/0181595 A1* | 7/2011 | Nachmanson et al. | 706/47 |
| 2011/0219368 A1* | 9/2011 | Festi | 717/174 |

OTHER PUBLICATIONS

Toon Verwaest, "Object-Oriented Component Detection for Software Understanding", 2007 Vrije University, Brussel, Belgium, pp. 1-64; <http://scg.unibe.ch/archive/external/Verwa07a.pdf>.*
Clark et al., "Using a Taxonomy Tool to Identify Changes in OO Software", Mar. 2003, CSMR'03, Benevento Italy, pp. 1-10; <www.cs.clemson.edu/~malloy/papers/csmr03/tax/paper.ps>.*
Pich et al., "Visual Analysis of Importance and Grouping in Software Dependency Graphs", Sep. 16, 2008 ACM, SOFTVIS 2008, pp. 29-32; <http://dl.acm.org/results.cfm?h=1&cfid=153430912&cftoken=64548907>.*

(Continued)

*Primary Examiner* — Thuy Dao
*Assistant Examiner* — Ben C Wang
(74) *Attorney, Agent, or Firm* — Zete Law, P.L.L.C.; MacLane C. Key

(57) ABSTRACT

Aspects of the subject matter described herein relate to automatically identifying groups and subgroups in dependency data. In aspects, a data structure that indicates dependencies between components is analyzed to create groups that are related by dependencies. The groups are further analyzed to create subgroups that depend on shared components but that do not depend on each other. Information about the components is used to generate names for the groups that are indicative of the components included in the groups. The groups, their names, and their relationships may then be displayed.

20 Claims, 11 Drawing Sheets

OTHER PUBLICATIONS

Gay, et al., "Qualitative Research: Data Analysis", retrieved at <<ftp://ftp.prenhall.com/pub/ect/education.q-089/airasian/PowerPoint%20Files/Chapter%2008.ppt>>, 2008, pp. 1-32.

"Data Representations and Transformations", retrieved at <<http://nvac.pnl.gov/docs/RD_Agenda_NVAC_chapter4.pdf>>, 2005, pp. 105-136.

"Data Modeling", retrieved at <<http://www.exforsys.com/tutorials/data-modeling.html>>, Jan. 28, 2009, pp. 1-5.

Ghoshal, Biraja., "Information Management", "Master Data Management—Transform Raw Data into Useful Information and Insight", retrieved at <<http://www.information-management.com/specialreports/20060720/1059573-1.html>>, Jul. 20, 2006, pp. 1-4.

Doval, et al., "Automatic Clustering of Software Systems using a Genetic Algorithm", Proceedings of the Software Technology and Engineering Practice, retrieved at <<http://ieeexplore.ieee.org/stamp/stamp.jsp?arnumber=00798481>>, Aug. 30-Sep. 2, 1999, pp. 1-9.

U.S. Appl. No. 12/210,815, filed Sep. 15, 2008.

* cited by examiner

IDENTIFYING GROUPS AND SUBGROUPS

BACKGROUND

Maintaining and understanding programs is challenging. Large programs may have millions of lines of code that implement hundreds of objects that interact with each other. Making changes to the code without properly understanding this interaction may cause the code to function in unintended ways.

In response, companies have created tools that generate graphical representations of interactions within a program. Unfortunately, these tools often do not give a good understanding of the program.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to automatically identifying groups and subgroups in dependency data. In aspects, a data structure that indicates dependencies between components is analyzed to create groups that are related by dependencies. The groups are further analyzed to create subgroups that depend on shared components but that do not depend on each other. Information about the components is used to generate names for the groups that are indicative of the components included in the groups. The groups, their names, and their relationships may then be displayed.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." Other definitions, explicit and implicit, may be included below.

Exemplary Operating Environment

Figure 1:
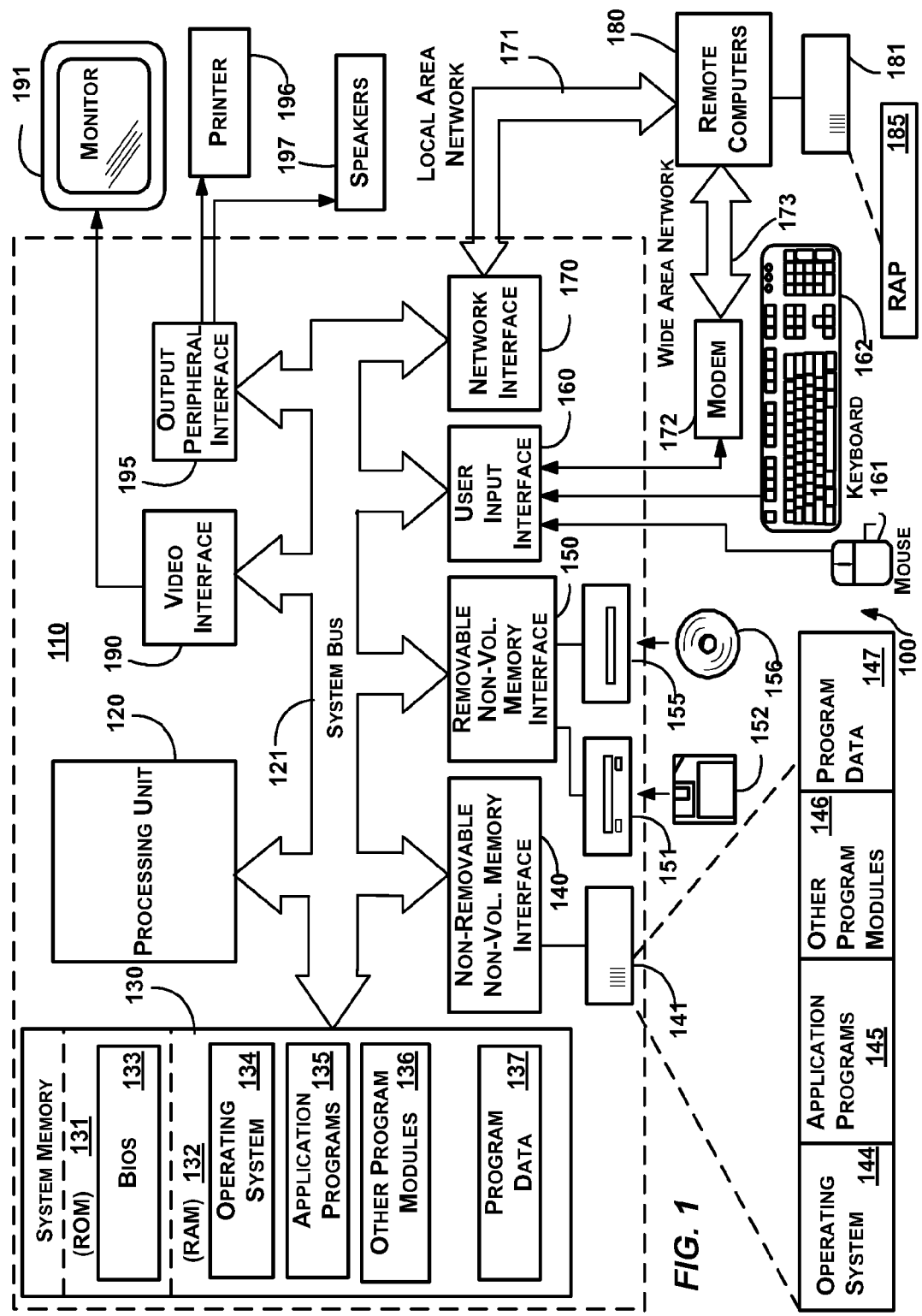
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Identifying Groups

As mentioned previously, maintaining and understanding programs is challenging. FIGS. 2-8 are block diagrams that represent various components and actions that may be performed to identify groups and subgroups in accordance with aspects of the subject matter described herein.

Figure 2:
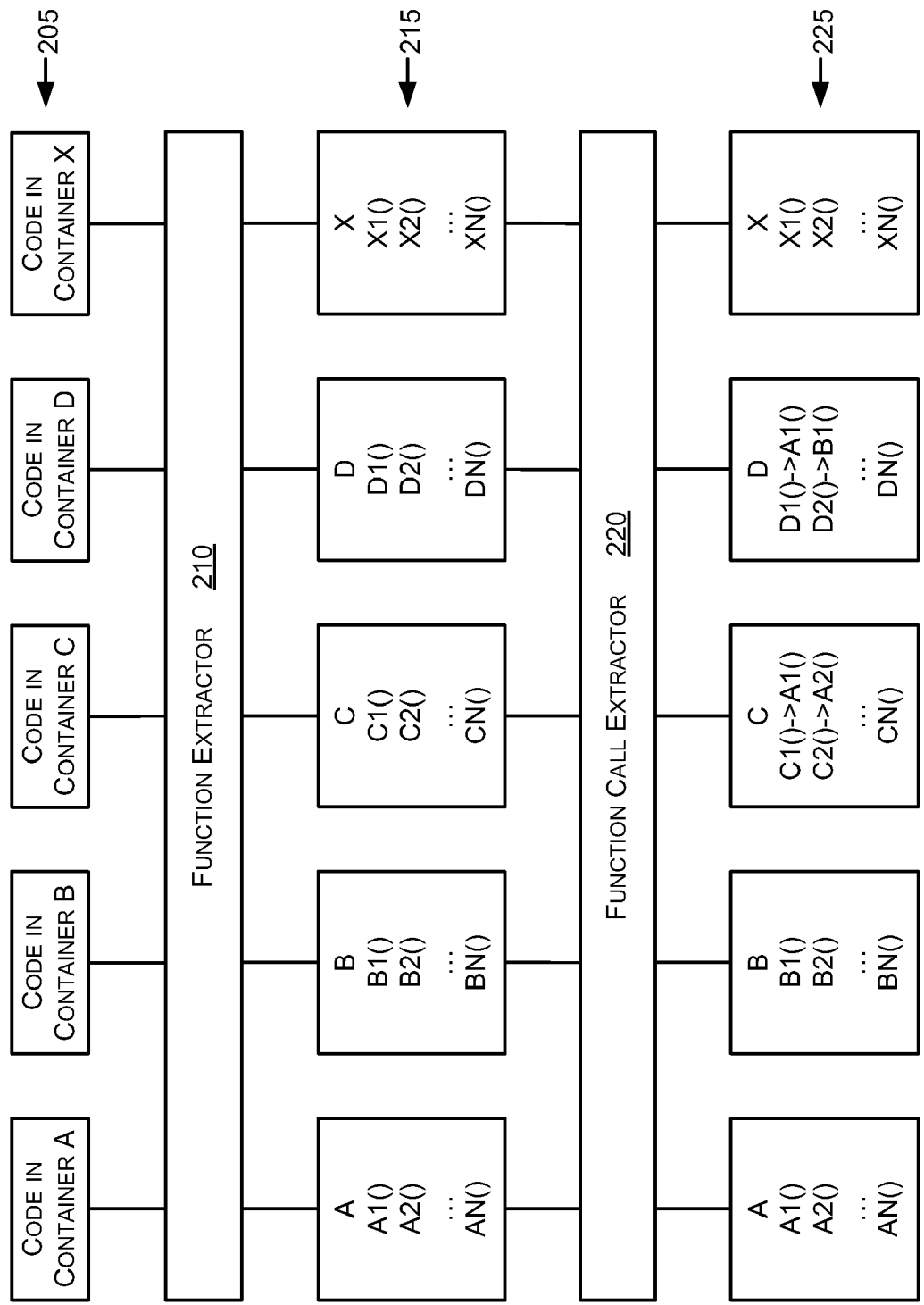
FIGS. 2-8 are block diagrams that represent various components and actions that may be performed to identify groups and subgroups in accordance with aspects of the subject matter described herein.

Turning to FIG. 2, illustrated are containers of code 205. The containers of code 205 may represent files, objects, dynamic link libraries, assemblies, classes, namespaces, components, or the like in which code may be contained or which code may implement. Hereafter, unless specified otherwise, the term component as used herein is sometimes used to refer to one or more of the items that the containers of code 205 may represent. The term component may also be read to include all or a portion of a device, one or more software components executing on one or more devices, some combination of one or more software components and one or more devices, and the like.

Often, code that is used to implement a program is broken up into separate physical files. Even when the code of a particular program is not broken up into separate physical files, it still may use (e.g., call) other code that is external to the code of the program. Furthermore, various components of a program, even when not broken up into separate files, will often call other components of the program.

The code in the containers 205 may be operated on by a function extractor 210 that extracts function names 215 from the code. The term "function" as used herein may be thought of as a portion of code that performs one or more tasks. Although a function may include a block of code that returns data, it is not limited to blocks of code that return data. A function may also perform a specific task without returning any data. Furthermore, a function may or may not have input parameters. A function may include a subroutine, a subprogram, a procedure, method, routine, or the like.

The extracted function names 215 may be operated on by the function call extractor 220. Using the code and the extracted function names 215, the function call extractor 220 may generate function call information 225 that indicates what functions are called by other functions. For example, the function call extractor 220 may determine that the function C1 calls the function A1, that the function C2 calls the function A2, that the function D1 calls the function A1, and that the function D2 calls the function B1. The function call information 225 may be represented as a graph or some other data structure.

Figure 3:
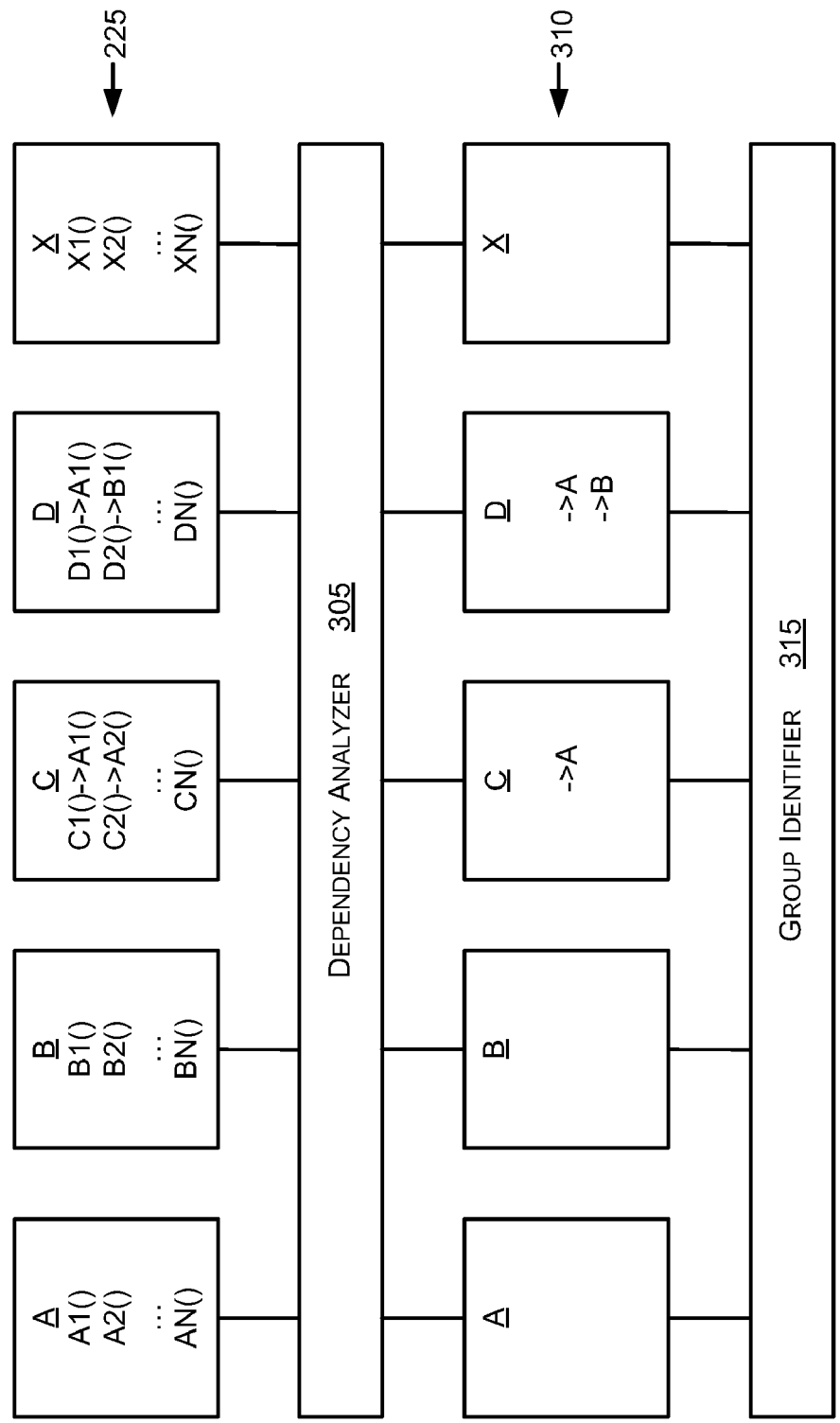

Turning to FIG. 3, the function call information 225 may be operated on by a dependency analyzer 305. The dependency analyzer 305 may determine which components are dependent on which other components. For example, based on the exemplary function call information 225 described above, the dependency analyzer 305 may determine that the component C depends on the component A and that the component D depends on the components A and B. This is represented by the dependency information 310.

Figure 4:
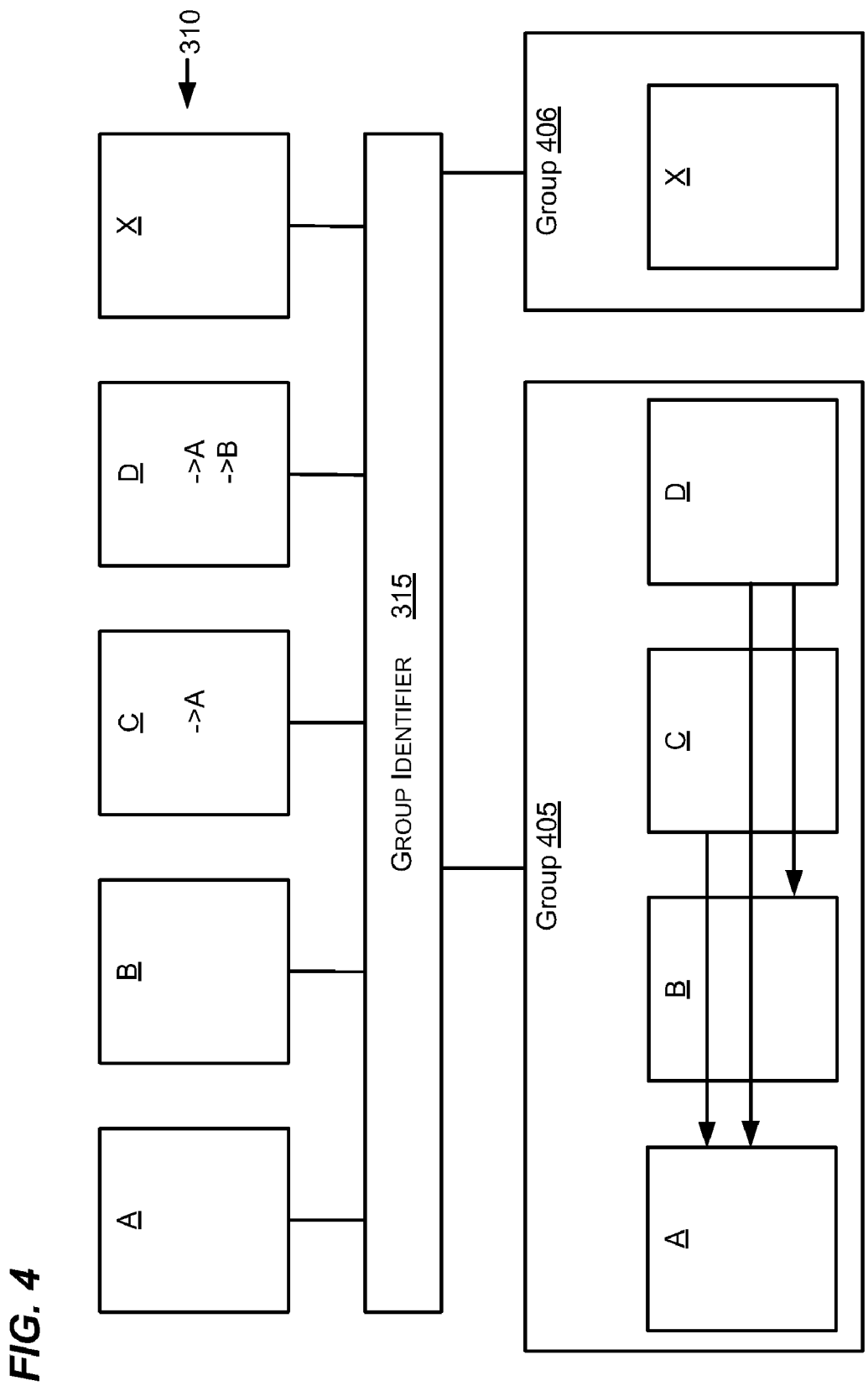

The dependency information 310 is used by the group identifier 315 to identify groups of components. The groups are determined based on what components depend on other components. Turning to FIG. 4, the group identifier 315 has identified two groups, namely group 405 and group 406. To identify a group, the group identifier 315 may iterate the components represented by the dependency information 310. If a component depends on another component, the two components and any other components in their respective groups are placed in the same group. This has the effect of grouping components together based on component dependencies.

For example, the group identifier 315 may start with A. Since A does not depend on another component, it may be placed in its own group (e.g., group 405). The group identifier 315 may then iterate to B. Since B does not depend on another component, it may also be placed in its own group (not shown). The group identifier 315 may then iterate to C. Since C depends on A, C may be placed in A's group (e.g., group 405). When iterating to D, the group identifier 315 may first determine that D depends on A and may place the D in A's group. However, D also depends on B, so then B's group may be combined with A's group to form group 405.

In iterating to X, the group identifier 315 may place X in its own group (e.g., group 406). Since X does not depend on another component and since no component depends on X, X's group may remain separate from other groups.

It is possible for one or more circular dependencies to occur. For example, one or more functions in A may depend on one or more functions in B while one or more functions in B may depend on one or more functions in A. In this example, A and B are dependent on each other and a circular dependency exists between A and B. In one embodiment, when a circular dependency occurs, the two or more components involved in the circular dependency may be placed in the same group.

In another embodiment, when a component has a "weak" circular dependency on one or more other components, the component may be treated, for grouping purposes, as if it did not have a dependency on the other component. "Weak" as used herein relates to the number of dependencies a component has on another component. For example, if component A has a single dependency on component C and component C has several dependencies on component A, A may be said to have a weak circular dependency on C while C may be said to have a strong circular dependency on A. For grouping purposes, A may be treated as if it did not have a dependency on C. This may be useful, for example, when identifying shared components as described below.

Note that the number of dependencies that may be used to indicate a weak circular dependency may be hard coded, specified by a system administrator or the like, determined by a function that operates on the number of dependencies between the components, or determined in another way. The function mentioned above may determine, for example, the ratio of dependencies between components that are circularly dependent on each other. For example, if A has ten dependencies on C and C has a hundred dependencies on A, the ratio of dependencies from A to C is one tenth. If this ratio is below a threshold, the function may determine that A has a weak circular dependency on C.

Note also that in displaying a graphical representation of groups and their relationships (as illustrated in part 810 of FIG. 8), a weak circular dependency may be indicated in some graphical way (e.g., a graphic bitmap, line width, color, or the like) so that a user viewing the representation may be aware that there is a circular dependency. The user may also be provided with a way (e.g., clicking on a button, link, or the like) to view the circular dependency.

The mechanism for grouping components together given above is exemplary only and is not intended to be all-inclusive or exhaustive of all the different algorithms that may be used to group components together based on their dependency. From the teachings herein, those skilled in the art may recognize many other algorithms that may be used to group components together to achieve the same result without departing from the spirit or scope of aspects of the subject matter described herein.

Figure 5:
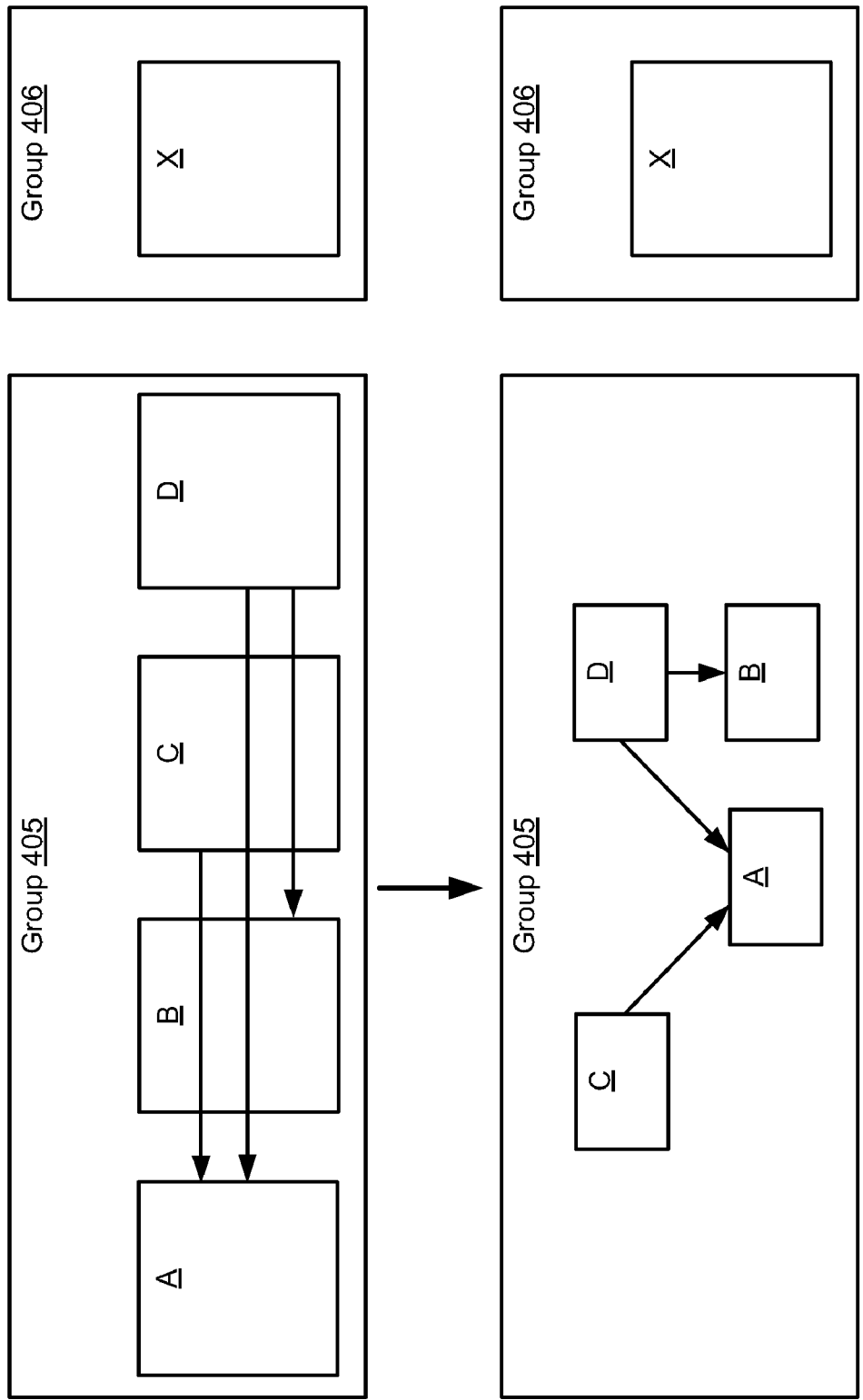

The group identifier 315 may further identify common dependencies as illustrated in FIG. 5. This may be done by a variety of ways. For example, if the dependency information 310 is represented as a graph, nodes of the graph may be visited to determine what nodes depend on them. This information may be recorded in a data structure associated with the nodes or graph. Turning to FIG. 5, it can be seen that C and D have a common dependency of A while D is the only component that depends on B.

Figure 6:
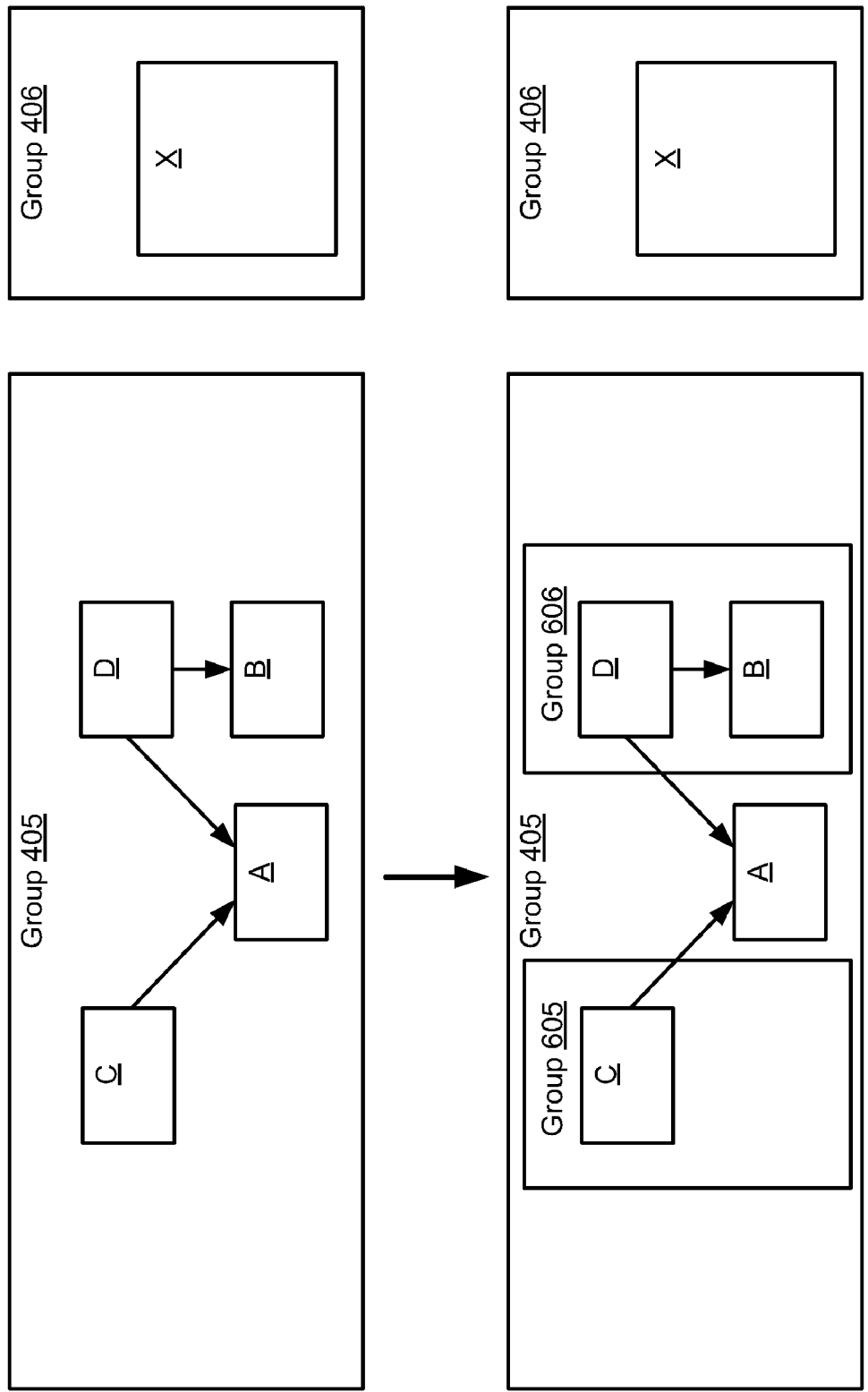

Using the information obtained by identifying common dependencies, the group identifier 315 may create subgroups within a group as illustrated in FIG. 6. The group identifier 315 may do this by grouping each component with the components it depends on except that components that are depended on by two or more components are left outside of groups. For example, turning to FIG. 6, the group 405 has been subgrouped into group 605 and 606. Group 605 includes C while group 606 includes D and B. The component A is left outside of the groups 605-606 as it is depended on by two or more components (e.g., C and D).

In creating groups and subgroups, the group identifier 315 may use any of many naming conventions. In one naming convention, the group identifier may start off with a sequentially numbering system in which the first group created is called group 1, the second group created is called group 2, and so on. When subgroups are created, the subgroups may take on the name of their parent group together with a number. For example, group 605 may be called group 1.1 while group 606 may be called group 1.2.

Figure 7:
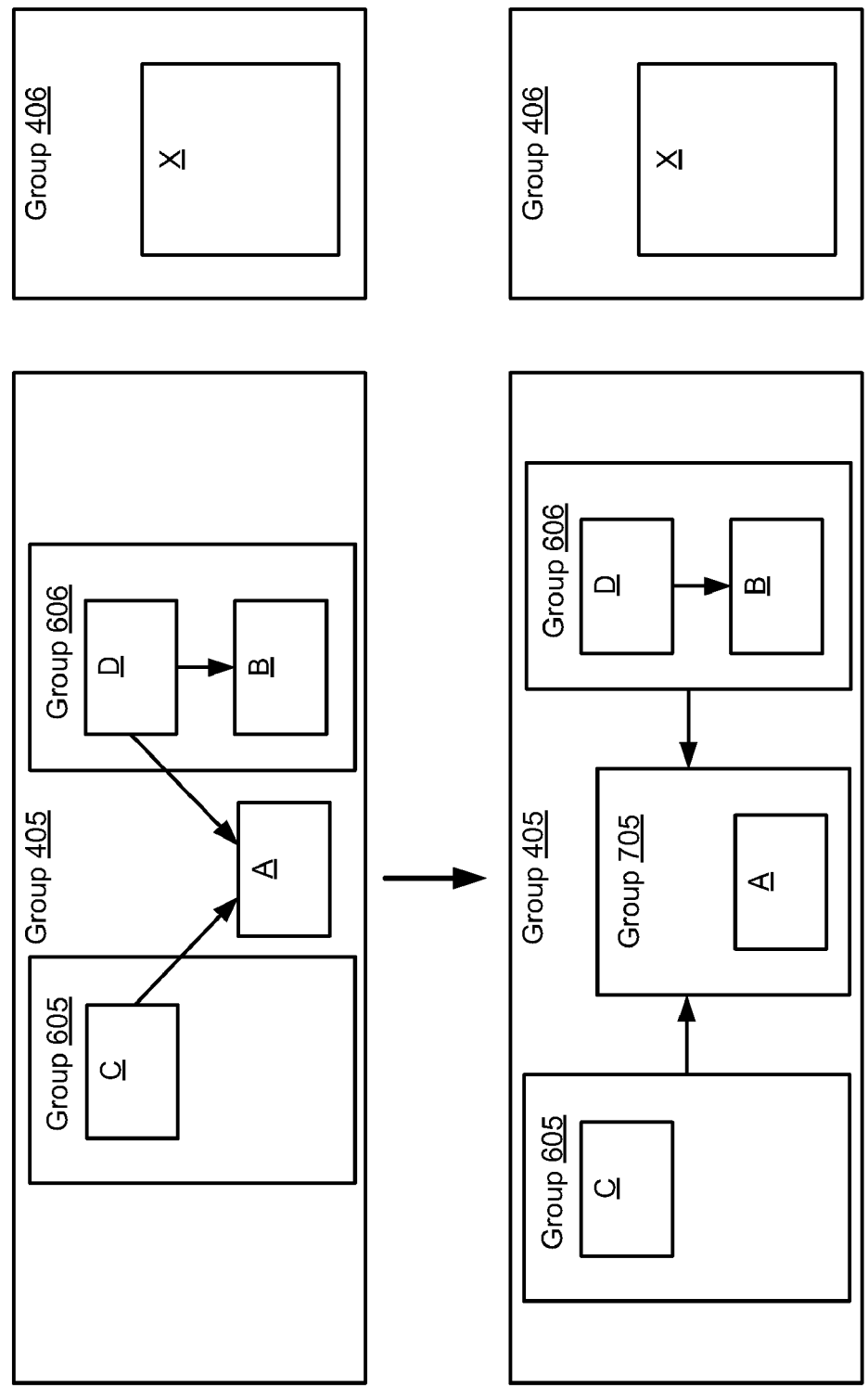

In conjunction with creating the subgroups 605 and 606, the group identifier 315 may create more subgroups for components that are depended on by two or more other components. In addition, the fact that a component depends on a component inside of another group may be replaced with information that indicates that group depends on another group. This is illustrated in FIG. 7 in which subgroup 705 has been created and dependencies from components in groups 605 and 606 to A have been replaced with dependencies from groups 605 and 606 to group 705.

For readability and user understanding, the components for groups may be replaced with names for the groups. The name for the group may indicate the components from which the group was created. For example, one method for determining the name of the group may comprise visiting each node of the group and determining the most common words found in the group. For example, the title of group 606 may be determined to be D+B, the title of group 605 may be determined to be C, and the title of group 406 may be determined to be X. Using the titles of groups 605 and 606, the title of group 405 may be determined to be C+{D+B}.

The name of a depended on group may be determined by finding the most common words in the components of the group and adding this to the name of an including group. For example, the name of group 705 may be determined to be "A common to C+{D+B}" using this mechanism.

As another example, common suffixes or prefixes may be dropped in forming a name. For example, if the components have a suffix of ".dll" or ".sys", this suffix may be dropped in forming a name for a component.

As yet another example, other uses of information associated with components inside a group may be used in generating a name for a group. For example, if a group includes components such as "OpenMusic" and "PlayMusic," a name generator (e.g. such as the name generator 940 of FIG. 9) may generate a name such as "Music", "Open & Play Music", "Music related functionality," or some other name related to these components.

The examples of naming groups given above are not intended to be all-inclusive or exhaustive. Based on the teachings herein, those skilled in the art may recognize many other mechanisms for naming a group based on its subgroups without departing from the spirit or scope of aspects of the subject matter described herein.

Figure 8:
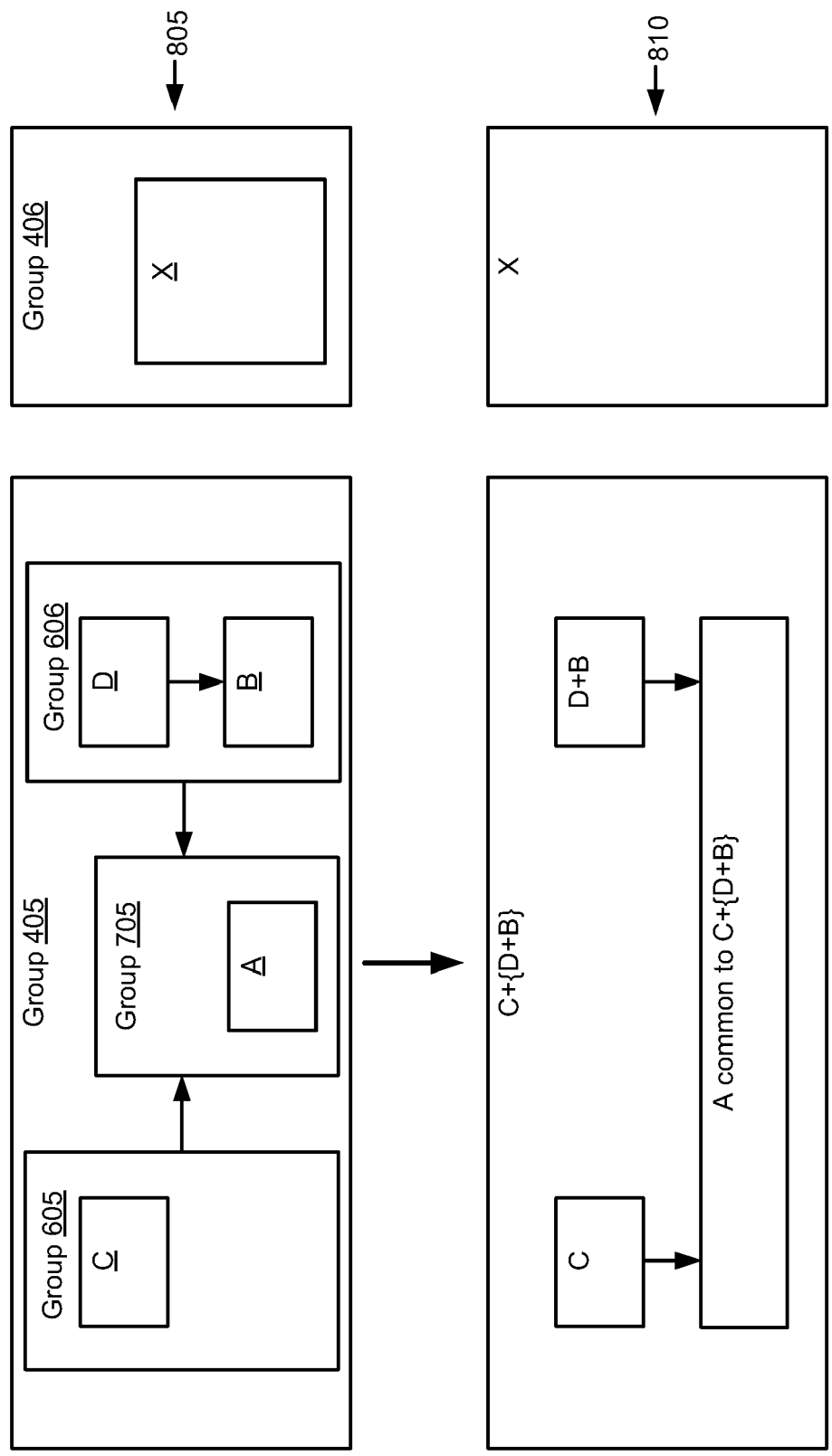

FIG. 8 is a diagram showing the result of naming groups according to this scheme. As illustrated in FIG. 8, the information in the part 810 has been generated by the information in the part 805.

Figure 9:
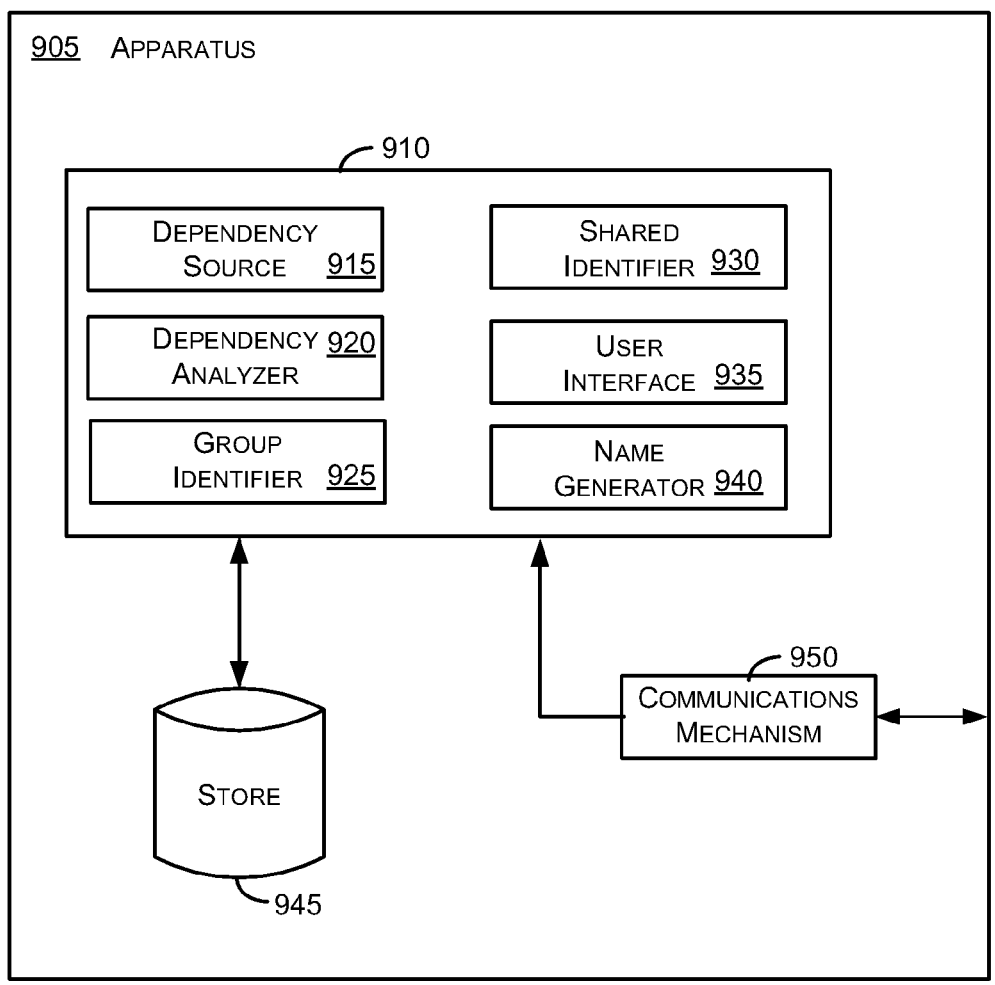
FIG. 9 is a block diagram that represents an apparatus configured in accordance with aspects of the subject matter described herein.

FIG. 9 is a block diagram that represents an apparatus configured in accordance with aspects of the subject matter described herein. The components illustrated in FIG. 9 are exemplary and are not meant to be all-inclusive of components that may be needed or included. In other embodiments, the components and/or functions described in conjunction with FIG. 9 may be included in other components (shown or not shown) or placed in subcomponents without departing from the spirit or scope of aspects of the subject matter described herein. In some embodiments, the components and/or functions described in conjunction with FIG. 9 may be distributed across multiple devices.

Turning to FIG. 9, the apparatus 905 may include grouping components 910, a store 945, a communications mechanism 950, and other components (not shown). The apparatus 905 may be implemented as a special or general purpose computer (e.g., as the computer 110 of FIG. 1). In one embodiment, the apparatus 905 may host computer programming software that utilizes the grouping components 910 to assist in understanding computer code.

The grouping components 910 may include a dependency source 915, a dependency analyzer 920, a group identifier 925, a shared identifier 930, a user interface 935, a name generator 940, and other components (not shown).

The communications mechanism 950 allows the apparatus 905 to communicate with other apparatuses. The communications mechanism 950 may be a network interface or adapter 170, modem 172, or any other mechanism for establishing communications as described in conjunction with FIG. 1.

The store 945 is any storage media capable of storing data. The term data is to be read broadly to include anything that may be stored on a computer storage medium. Some examples of data include code, program state, other data, and the like. The store 945 may comprise a file system, database, volatile memory such as RAM, other storage, some combination of the above, and the like and may be distributed across multiple devices. The store 945 may be external, internal, or include components that are both internal and external to the apparatus 905.

In particular, the store 945 may be operable to provide access to code, dependency graphs, or other information used or generated by one or more of the grouping components 910. Access as used herein may include reading, writing, deleting, updating, a combination including one or more of the above, and the like.

The dependency source 915 is operable to provide information regarding dependencies between components. For example, referring to FIG. 3, the dependency source 915 may provide the function call information 225. The dependency source 915 may obtain this information from a data structure stored on the store 945. This data structure may have been previously generated by a tool that examined code that implements the components.

In another embodiment, the dependency source 915 may generate the dependencies using code such as the container of code 205 illustrated in FIG. 2. In this embodiment, the dependency source 915 may include the functionality of the function extractor 210 and the function call extractor 220 of FIG. 2.

The dependency analyzer 920 is operable to generate dependency data from the information provided by the dependency source 915. This dependency data indicates dependencies between the components and may simplify the information provided by the dependency source 915. For example, if a component has multiple dependencies on another component (e.g., multiple functions in the component call one or more functions in the other component), this may be simplified to show a single dependency between the components. For example, referring to FIG. 3, the dependency analyzer 305 may simplify the function call information 225 into the dependency information 310.

The group identifier 925 is operable to use the dependency data generated by the dependency analyzer 920 to generate groups that identity components that are related via dependencies. For example, referring to FIG. 4, the group identifier 315 may be used to identify the groups 405 and 406 using the dependency information 310. As seen in FIG. 4, group 405 includes components A, B, C, and D that are related via dependencies while group 406 includes just component X as it is not related to any other group via a dependency.

The shared component identifier 930 is operable to determine components that are depended on by components in two or more groups. The shared component identifier 930 may be further operable to determine components that do not depend on other components. For example, referring to FIG. 6, the shared component identifier 930 may determine that component A is depended on by components in group 605 and group 606. The shared component identifier 930 may further determine that component A does not depend on other components.

The user interface 935 is operable to provide display data indicative of a dependency relationship between a first group and a second group that includes the components that are depended on by components in two or more groups. For example, referring to FIG. 8, the user interface 935 may display a diagram corresponding to the information of part 810. This diagram shows a first group (e.g., a group named C) and a second group (e.g., a group named A). The group A is depended on by the groups named C and D+B.

The name generator 940 is operable to generate a name for each group based on components included in the group. For example, referring to FIG. 8, the name generator 940 may generate the name of "C" for group 605, the name of "A" for group 705, and the name of "D+B" for group 606. The name generator 940 may also generate the name of "C+{D+B}" for group 405.

Figure 10:
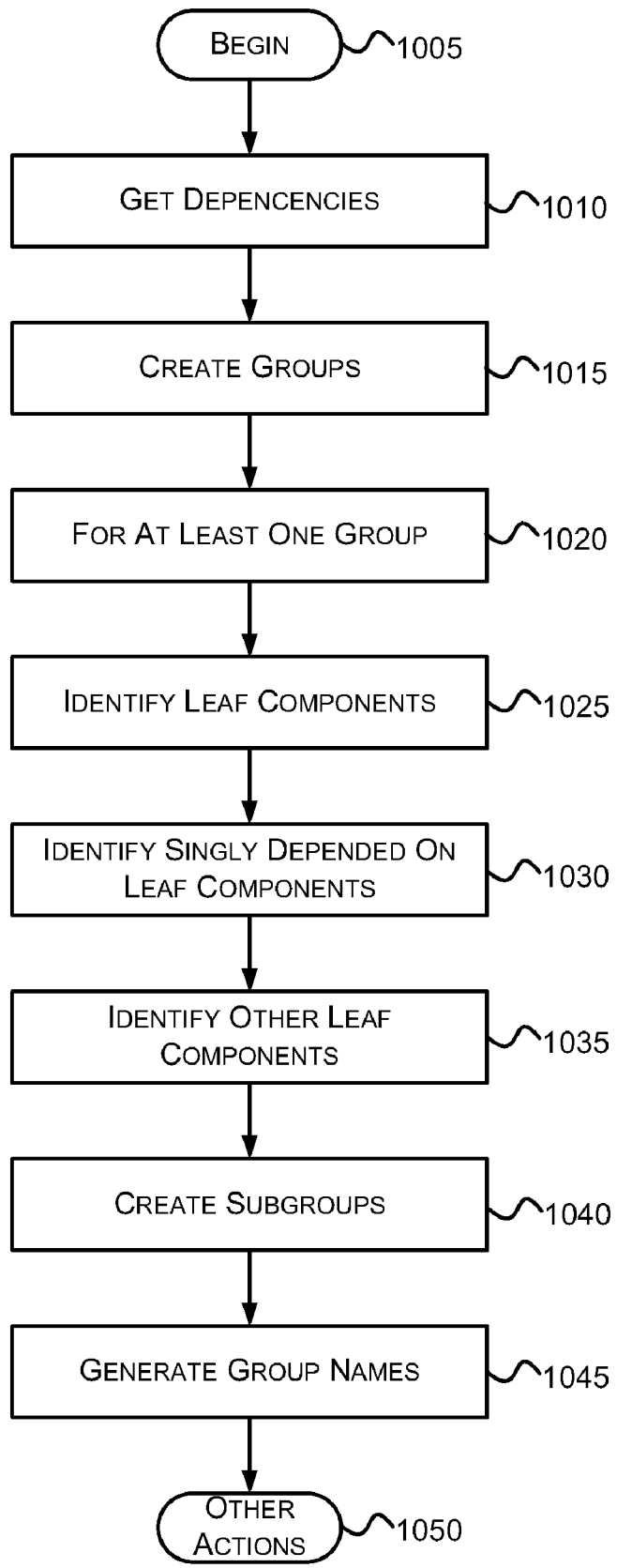
FIG. 10 is a flow diagram that generally represents one exemplary set of actions that may occur in identifying groups in accordance with aspects of the subject matter described herein.
Figure 11:
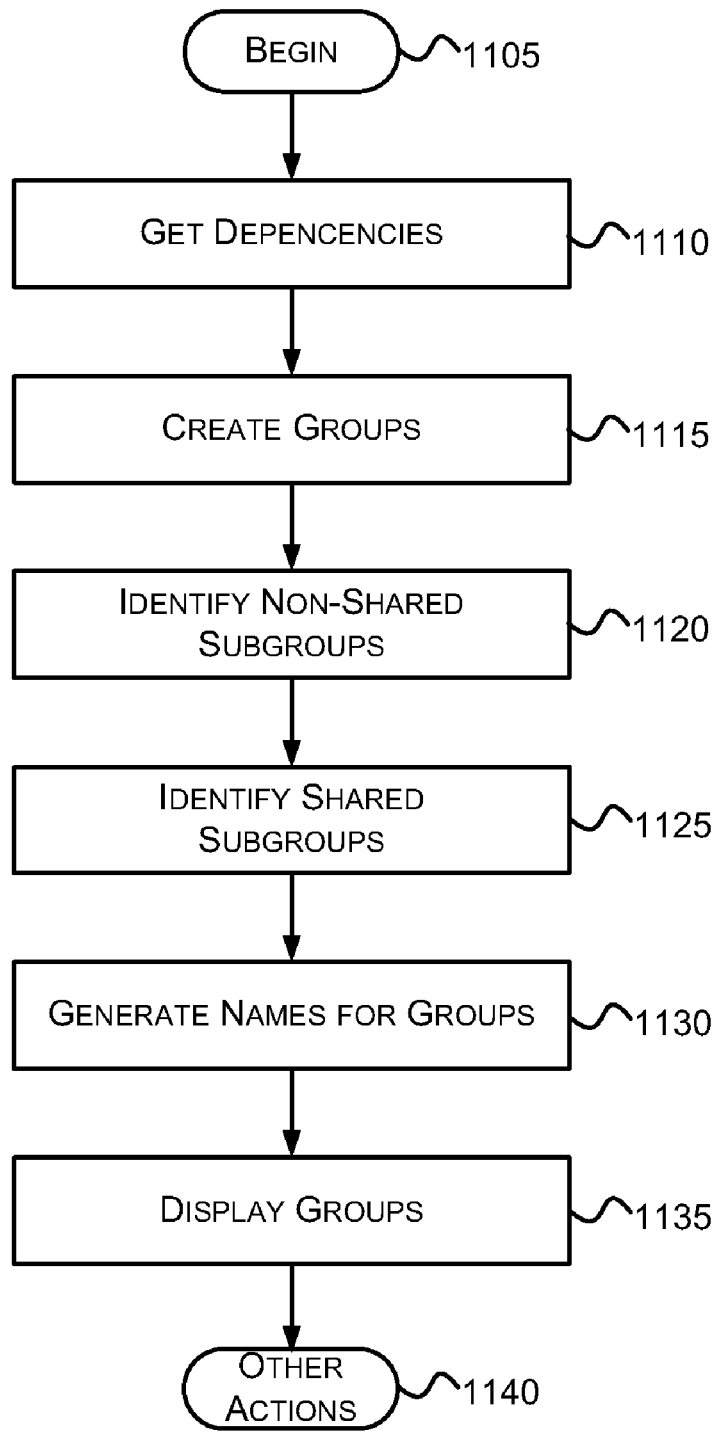
FIG. 11 is a flow diagram that generally represents another exemplary set of actions that may occur in identifying groups in accordance with aspects of the subject matter described herein.

FIGS. 10-11 are flow diagrams that generally represent actions that may occur in accordance with aspects of the subject matter described herein. For simplicity of explanation, the methodology described in conjunction with FIGS. 10-11 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Although some exemplary actions are illustrated in FIGS. 10-11, based on the teachings herein, those skilled in the art may recognize other actions or arrangement of actions that obtain the same results. Such other actions or arrangement of actions may also be used without departing from the spirit or scope of aspects of the subject matter described herein.

FIG. 10 is a flow diagram that generally represents one exemplary set of actions that may occur in identifying groups. Turning to FIG. 10, at block 1005, the actions begin.

At block 1010, component dependency information is obtained. This may involve obtaining a data structure that indicates dependencies between components. In one embodiment, the data structure may comprise a dependency graph and obtaining the data structure may comprise obtaining the data structure from a file. For example, referring to FIG. 9, the dependency source 915 may obtain dependency information from the store 945.

In another embodiment, obtaining component dependency information may comprise extracting information from code. In this extraction, function names may be extracted from the code as well as function names of functions called thereby. The function names and the called function names may then be associated.

At block 1015, groups are created. For example, referring to FIG. 4, the group identifier 315 uses dependency information 310 to create the groups 405 and 406.

Each group identifies components that are related via dependencies. A group of components are related via dependencies if any component of the group is reachable from any other component of the group by tracing a set of one or more dependencies. Each dependency associates one of the components of the group with another of the components of the group. For example, referring to FIG. 5, the group 405 is related via dependencies because each component can be reached from another component by tracing a group of one or more dependencies. For example, the component C can be reached from the component B by tracing the dependency from B to D, the dependency from D to A, and finally the dependency A to C.

At block 1020, for at least one of the groups created, the actions associated with blocks 1025-1045 are performed.

At block 1025, a set of leaf components are identified. A leaf component is a component that does not depend on other components. For example, referring to FIG. 5, A and B are the leaf components.

At block 1030, from this set of leaf components, the leaf components that are directly depended on by only one other component are identified. A directly depended on component is a component that is connected directly to the component via a dependency rather than a component that is dependent via a chain of two or more dependencies to a component. For example, referring to FIG. 5, the leaf component B is directly depended on by the component D while the component A is depended on by the components C and D.

At block 1035, from the set of leaf components, the leaf components that are directly depended on by two or more other components are identified. For example, referring to FIG. 5, the component A is identified.

At block 1040, subgroups are created. For example, referring to FIG. 6, the groups 605 and 606 are created. This may be done by associating the leaf component with a group that includes the component that directly depends on the leaf component (if only one component directly depends on the component), or associating the leaf component with its own group (if two or more components directly depend on the component). An example of the latter case is illustrated in FIG. 7 in which the component A is associated with its own group 705.

At block 1045, group names are generated. For example, referring to FIG. 8, group 605 is given the name of "C", group 606 is given the name of "D+B", group 705 is given the name of "A", and group 405 is given the name of "C+{D+B}". As can been seen, the group names may be indicative of the components included in the group and may be generated as described previously.

At block 1050, other actions, if any, are performed.

FIG. 11 is a flow diagram that generally represents another exemplary set of actions that may occur in identifying groups. Turning to FIG. 11, at block 1105, the actions begin.

At block 1110, component dependency information is obtained. For example, referring to FIG. 9, the dependency source 915 may obtain dependency information from the store 945.

At block 1115, groups are created. For example, referring to FIG. 4, the group identifier 315 uses dependency information 310 to generate the groups 405 and 406.

At block 1120, non-shared subgroups groups are identified. This may involve identifying within the groups created at block 1115, a set of subgroups where each of the subgroups includes one or more components. If the subgroup includes two or more components, the two or more components being related via dependencies. Furthermore, each of the subgroups of the set do not depend on any component in another subgroup of the set. For example, referring to FIG. 6, the groups 605 and 606 are generated. Group 605 includes a single component while group 606 includes two components D and B that are related via a dependency.

At block 1125, shared subgroups are identified. For example, referring to FIG. 7, the shared group 705 is created. The group 705 is depended on by at least two components of the set mentioned in conjunction with block 1120, namely components C and D. The components C and D are in different subgroups of the set.

At block 1130, names are generated for the groups. For example, referring to FIGS. 8 and 9, the name generator 940 generates the names illustrated in part 810. As indicated before, this may be done, for example, by searching data associated with components of a group for commonly occurring words. In one embodiment, this may be done by searching metadata for title data of components included in a subgroup. For example, metadata may include a title field, date, version, size, type, or name of a file associated with a component, or other information about the component.

At block 1135, the groups and relationships there between are displayed. For example, referring to FIG. 8, the information represented in part 810 may be displayed.

At block 1140, other actions, if any, are performed.

Although the foregoing has often referred to identifying groups and subgroups in dependencies obtained from code, aspects of the subject matter described herein may also be applied to dependencies in virtually any other type of environment. For example, a manufacturing process may have dependencies between steps or components used in the manufacturing process, an educational institution may have dependencies between courses or subjects, a recipe for may have dependencies between items in the recipe and how they are combined, and so forth. These dependencies may be represented in a data structure (e.g., similar to the dependency information 310) that may then be examined to identify groups and subgroups using the techniques described previously. In one embodiment, the term component may include anything physical, abstract, or otherwise that can be represented in a dependency relationship. Furthermore, the above examples are not meant to be exhaustive or all-inclusive. Indeed, those skilled in the art may recognize many other environments in which aspects of the subject matter described above may be applied without departing from the spirit or scope of aspects of the subject matter described herein.

As can be seen from the foregoing detailed description, aspects have been described related to identifying groups and subgroups. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   obtaining a data structure that indicates dependencies between components;
   via the data structure, creating a set of groups, each group identifying components that are related via dependencies;
   for at least one of the groups, performing actions, comprising:
      identifying a first set of one or more leaf components that do not depend on other components of the at least one of the groups or that weakly depend on other components of the at least one of the groups;
      identifying, in the first set, a second set of one or more of the leaf components, each of the leaf components of the second set directly depended on by only one other component;
      identifying, in the first set, a third set of one or more leaf components, each of the leaf components in the third set directly depended on by two or more other components.

2. The method of claim 1, for the at least one of the groups, performing additional actions, comprising:
   associating a leaf component of the second set of one or more leaf components with a group associated with the one other component that directly depends on the leaf component; and
   generating a name for the group that is indicative of components included in the group.

3. The method of claim 1, for the at least one of the groups, performing additional actions, comprising:
   associating a leaf component of the third set of one or more leaf components with a group; and
   generating a name for the group that is indicative of the components that depend on the group.

4. The method of claim 1, for the at least one of the groups, performing additional actions, comprising generating a name for the at least one of the groups group that is indicative subgroups included in the group.

5. The method of claim 1, wherein a group of components are related via dependencies if any first component of the group is reachable from any second component of the group by tracing a set of one or more dependencies, each dependency associating one of the components of the group with another of the components of the group.

6. The method of claim 1, wherein the components comprise files that include computer code.

7. The method of claim 1, wherein the components are distributed among a plurality of computers.

8. The method of claim 1, wherein obtaining a data structure that indicates dependencies between components comprises:

extracting first function name information from code, the first function name information including names of functions included in the code;

extracting second function name information from the code, the second function name information including names of functions called by functions corresponding to the first function name information; and associating each function name of the first function name information with each function name called thereby, if any, of the second function name information.

9. The method of claim 1, wherein the data structure comprises a dependency graph and wherein obtaining a data structure that indicates dependencies between components comprises obtaining the data structure from a file.

10. A computer storage device having computer-executable instructions, which when executed perform actions, comprising:

obtaining a data structure that indicates dependencies between components of code;

generating a group that identifies components that are related via dependencies;

identifying within the group a first set of subgroups, each subgroup of the first set of subgroups including one or more components, if the subgroup includes two or more components, the two or more components being related via dependencies, each subgroup of the first set of subgroups not depending on any component in another subgroup of the first set; and identifying within the group a second set of one or more subgroups within the group, each subgroup being depended on by at least two components of the first set of subgroups, the at least two components being in different subgroups of the first set.

11. The computer storage device of claim 10, further comprising generating a name for a subgroup of the first set of subgroups, the name being indicative of components in the subgroup.

12. The computer storage device of claim 11, wherein generating a name for a subgroup of the first set of subgroups comprises searching data for most commonly occurring words, the data associated with components of the subgroup.

13. The computer storage device of claim 11, wherein generating a name for a subgroup of the first set of subgroups comprises searching metadata for title data of components included in the subgroup.

14. The computer storage device of claim 10, further comprising displaying a representation of relationships between at least two groups of the first set of subgroups and a corresponding group of the second set of one or more subgroups.

15. The computer storage device of claim 10, further comprising generating a name for the group based on subgroups included in the group.

16. In a computing environment, an apparatus, comprising:
a processor;

a dependency source operable to provide information regarding dependencies between computer-implementable components;

a dependency analyzer operable to generate dependency data from the information, the dependency data indicating dependencies between the components;

a group identifier operable to use the dependency data to generate a group that identifies components that are related via dependencies; and a shared component identifier operable with the processor to determine within the group a first set of subgroups, each subgroup of the first set of subgroups including one or more components, if the subgroup includes two or more components, the two or more components being related via dependencies, each component of any subgroup of the first set of subgroups not depending on any component in another subgroup of the first set and to determine within the group a second set of one or more subgroups within the group, each component of any subgroup of the second set being depended on by at least two components of different subgroups of the first set of subgroups.

17. The apparatus of claim 16, wherein the dependency source is further operable to obtain the information from a data structure stored on a data store, the data structure being previously generated by a tool that examined code implementing the components.

18. The apparatus of claim 16, further comprising a user interface operable to provide display data indicative of a dependency relationship between the group generated by the group identifier and a group that includes the components that are depended on by components in two or more groups.

19. The apparatus of claim 18, further comprising a name determiner operable to generate a name for each group based on components included in the group, the display data including each name.

20. The apparatus of claim 16, wherein the shared component is further operable to determine components that do not depend on other components.

* * * * *